US008618911B2

(12) United States Patent
Adams et al.

(10) Patent No.: US 8,618,911 B2
(45) Date of Patent: *Dec. 31, 2013

(54) SIMPLIFIED BIOMETRIC CHARACTER SEQUENCE ENTRY

(75) Inventors: Neil Patrick Adams, Waterloo (CA); Dinah Lea Marie Davis, Waterloo (CA); Ravi Singh, Waterloo (CA); Richard Paul Sibley, Sunnyvale, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,401

(22) Filed: Sep. 14, 2012

(65) Prior Publication Data

US 2013/0009748 A1    Jan. 10, 2013

Related U.S. Application Data

(63) Continuation of application No. 12/558,927, filed on Sep. 14, 2009, now Pat. No. 8,330,577.

(30) Foreign Application Priority Data

Dec. 1, 2008 (EP) ..................................... 08170377

(51) Int. Cl.
    *G06F 7/04* (2006.01)
(52) U.S. Cl.
    USPC .......................................... 340/5.83; 382/124
(58) Field of Classification Search
    USPC ................... 340/5.83, 5.84, 5.74, 5.53, 5.54; 382/115, 124; 455/410, 411
    See application file for complete search history.

(56) References Cited

U.S. PATENT DOCUMENTS

| 5,933,515 A | 8/1999 | Pu et al. |
| 6,229,906 B1 | 5/2001 | Pu et al. |
| 6,393,139 B1 | 5/2002 | Lin |
| 6,944,773 B1 * | 9/2005 | Abrahams ..................... 713/168 |
| 2002/0021352 A1 * | 2/2002 | Sato .......................... 348/14.02 |
| 2002/0181747 A1 | 12/2002 | Topping |
| 2003/0152253 A1 | 8/2003 | Wong |
| 2005/0134427 A1 | 6/2005 | Hekimian |
| 2006/0110013 A1 | 5/2006 | Lee |
| 2006/0226951 A1 | 10/2006 | Aull et al. |

FOREIGN PATENT DOCUMENTS

| DE | 10317296 | 11/2004 |
| EP | 1283502 | 2/2003 |

OTHER PUBLICATIONS

Extended European Report mailed Jul. 3, 2009, in corresponding European patent application No. 08170377.9.

* cited by examiner

*Primary Examiner* — Edwin Holloway, III
(74) *Attorney, Agent, or Firm* — Novak Druce Connolly Bove + Quigg LLP

(57) ABSTRACT

A device having a biometric input device is configured to allow a user to enter a character sequence for use in validation using the biometric input device. A predetermined assignment of characters to enrolled biometric templates allows a user to determine a sequence of biometric inputs to provide to enter an appropriate character sequence.

27 Claims, 8 Drawing Sheets

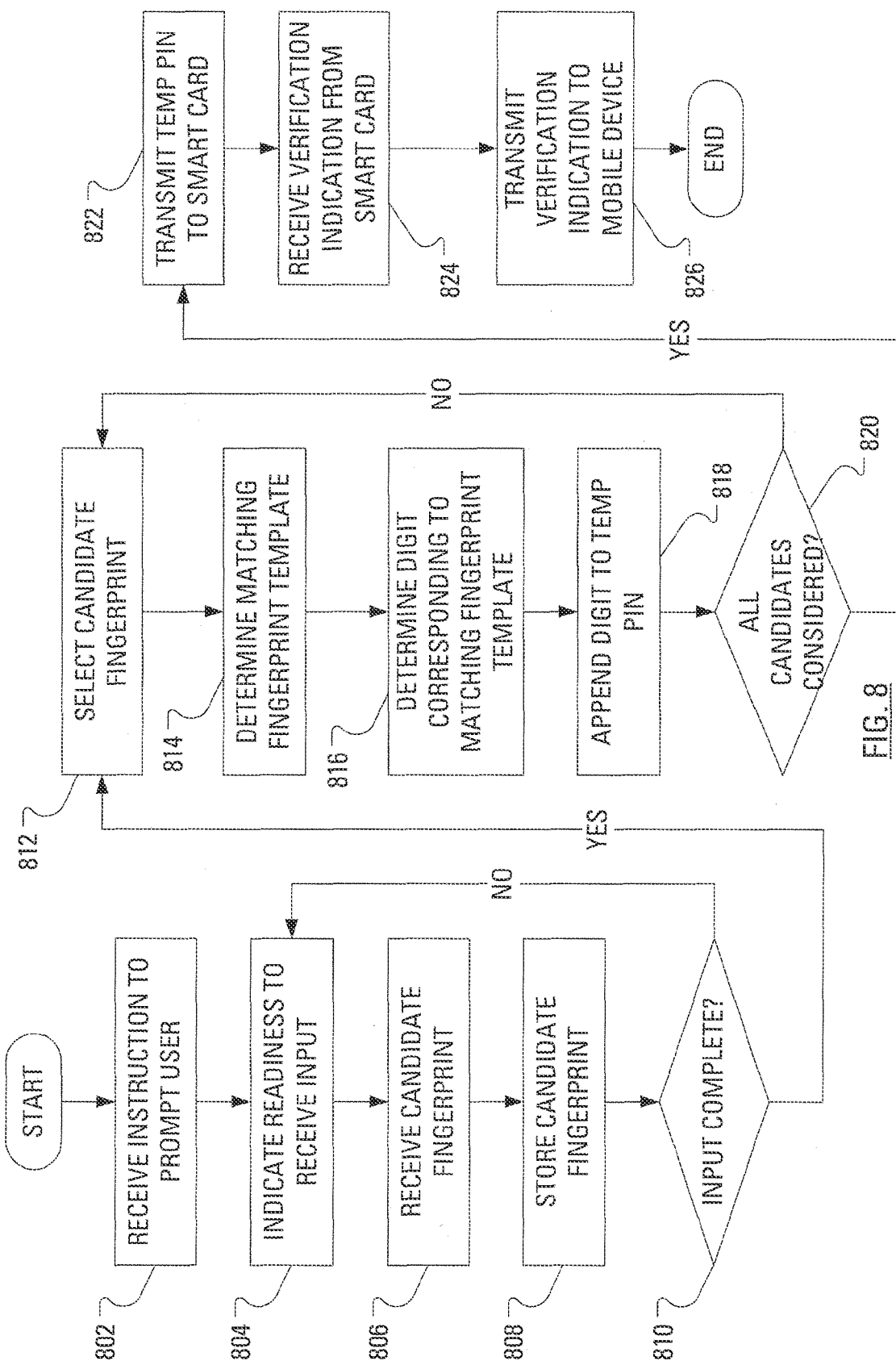

SIMPLIFIED BIOMETRIC CHARACTER SEQUENCE ENTRY

CROSS REFERENCE TO RELATED APPLICATIONS

The present application is a continuation of U.S. patent application Ser. No. 12/558,927, filed Sep. 14, 2009. U.S. patent application Ser. No. 12/558,927 claims priority to European Patent Application EP08170377.9, filed Dec. 1, 2008, the contents of both documents are hereby incorporated herein by reference in their entireties.

FIELD

The present application relates generally to device security and, more specifically, to providing for character sequence entry through the use of biometric information.

BACKGROUND

When securely accessing a device or an executable application, a user often has to enter a character sequence, sometimes known as a Personal Identification Number (PIN). Occasionally, the element that requires character sequence entry is without a keypad on which a PIN might otherwise be entered. Accordingly, the user generally enters the PIN using a device (e.g., a mobile phone, a portable digital assistant, a personal computer) that is in communication with the element that requires character sequence entry.

BRIEF DESCRIPTION OF THE DRAWINGS

Reference will now be made to the drawings, which show by way of example, embodiments of the present disclosure, and in which:

FIG. 8 illustrates example steps in a method, as an alternative to the method of FIG. 7, carried out by the smart card reader of FIG. 1, of receiving user input and transmitting a character sequence, determined from the user input, to the smart card of FIG. 1.

DETAILED DESCRIPTION OF THE EMBODIMENTS

Figure 1:
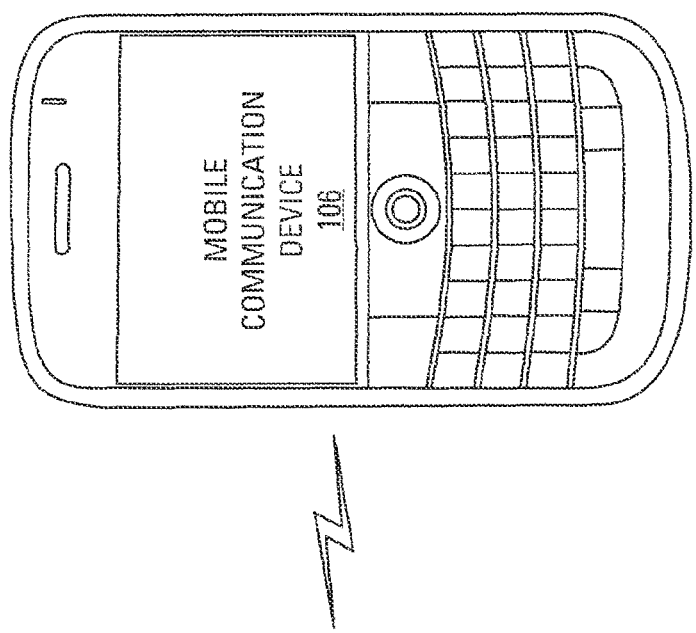
FIG. 1 illustrates an environment in which a smart card is illustrated along with a mobile communication device that communicates wirelessly with a smart card reader.
Figure 1:
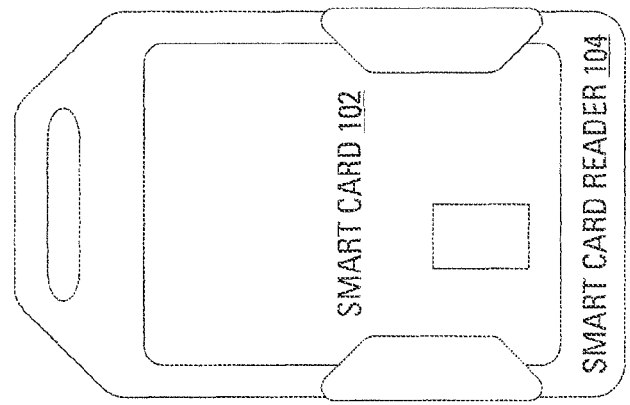

An example element that may require entry of a PIN or other character sequence is a smart card. Frequently, communication between a smart card and a device that uses information stored on the smart card is facilitated by a smart card reader. In the case wherein the smart card reader does not have a keypad for PIN entry, a candidate PIN may be entered on a keypad on the device and transmitted to the smart card reader.

Subsequent to a candidate PIN being entered on the device, the candidate PIN is transmitted between several different software and hardware components of that device. For example, the candidate PIN may be transmitted from a user interface (UI) component that has received the candidate PIN to an application that caused the UI component to be presented to the user. Furthermore, the UI component may transmit the candidate PIN to a kernel and the kernel may transmit the candidate PIN to the smart card reader via several more components. In some cases, the candidate PIN may be transmitted to the smart card reader as clear text; in other cases, the candidate PIN may be transmitted to the smart card reader in an encrypted form. An attacker, therefore, has multiple opportunities to intercept a transmission of the candidate PIN from component to component between the time at which the user enters the candidate PIN on the device and the time at which the candidate PIN is transmitted by the smart card reader to the smart card.

To limit the number of inter-component transmissions of the candidate PIN and, thus, limit the number of interception points available to an attacker, it has been suggested to provide the smart card reader with a keypad for PIN entry. However, the addition of a keypad to a smart card reader has potential to add size, cost and weight, each of which are undesirable. In particular, size and weight are of concern for a wireless smart card reader that is worn on a lanyard that hangs around the neck of a user.

A device having a biometric input device is configured to allow user input of a character sequence for use in validation using the biometric input device. A predetermined assignment of characters to enrolled biometric templates allows a user to determine a sequence of biometric inputs to provide to enter an appropriate character sequence.

According to one aspect described herein, there is provided a method of handling receipt of a character sequence. The method may comprise receiving a candidate sequence of a plurality of biometric candidates and forming a character sequence from the candidate sequence. The character sequence may be formed by, for each biometric candidate in the candidate sequence, determining that the biometric candidate matches a stored biometric template and determining that the stored biometric template is associated with a character. In other aspects of the present application, an apparatus is provided for carrying out this method and a computer readable medium is provided for adapting a processor to carry out this method.

Other aspects and features of the present disclosure will become apparent to those of ordinary skill in the art upon review of the following description of specific embodiments of the disclosure in conjunction with the accompanying figures.

FIG. 1 illustrates an exemplary communication system 100 that includes a mobile communication device 106 that is enabled to communicate wirelessly with a peripheral device in the form of a smart card reader 104. A smart card 102 is illustrated mounted in the smart card reader 104. The smart card 102 may be considered to be an embodiment of an element that may, more generically, be known as an identity verification element.

Figure 2:
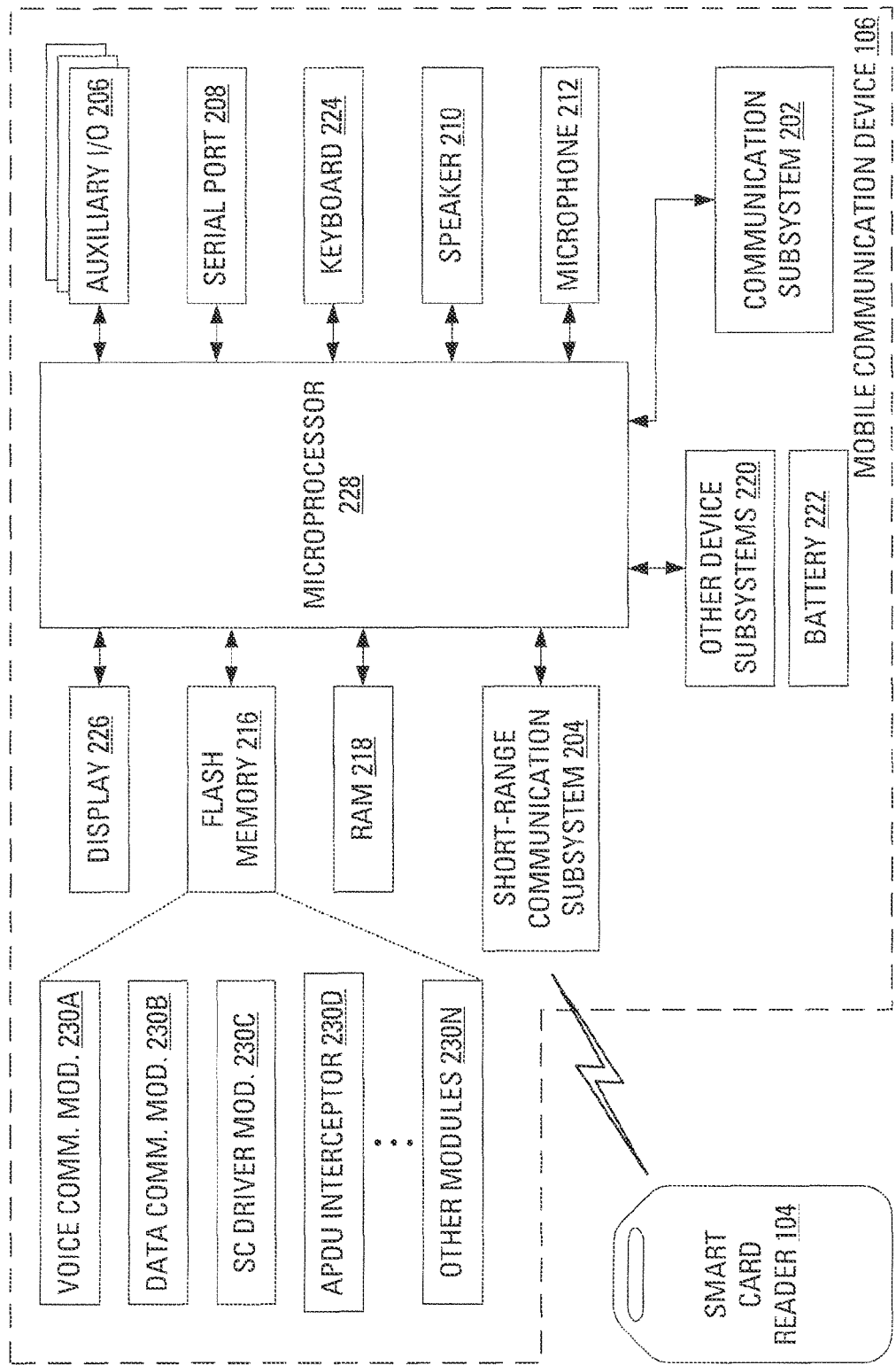
FIG. 2 schematically illustrates the mobile communication device of FIG. 1.

FIG. 2 illustrates the mobile communication device 106 including a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 106, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card (SC) driver module 230C may also be installed on the mobile communication device 106 during manufacture. Furthermore, a command APDU interceptor 230D may also be installed on the mobile communication device 106 to implement aspects of the present disclosure. As well, additional software modules, illustrated as another software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 where the smart card reader also implements a Bluetooth™ communication module. As another example, the short-range communications subsystem 204 may include an infrared device to provide for communication with similarly-enabled systems and devices.

Figure 3:
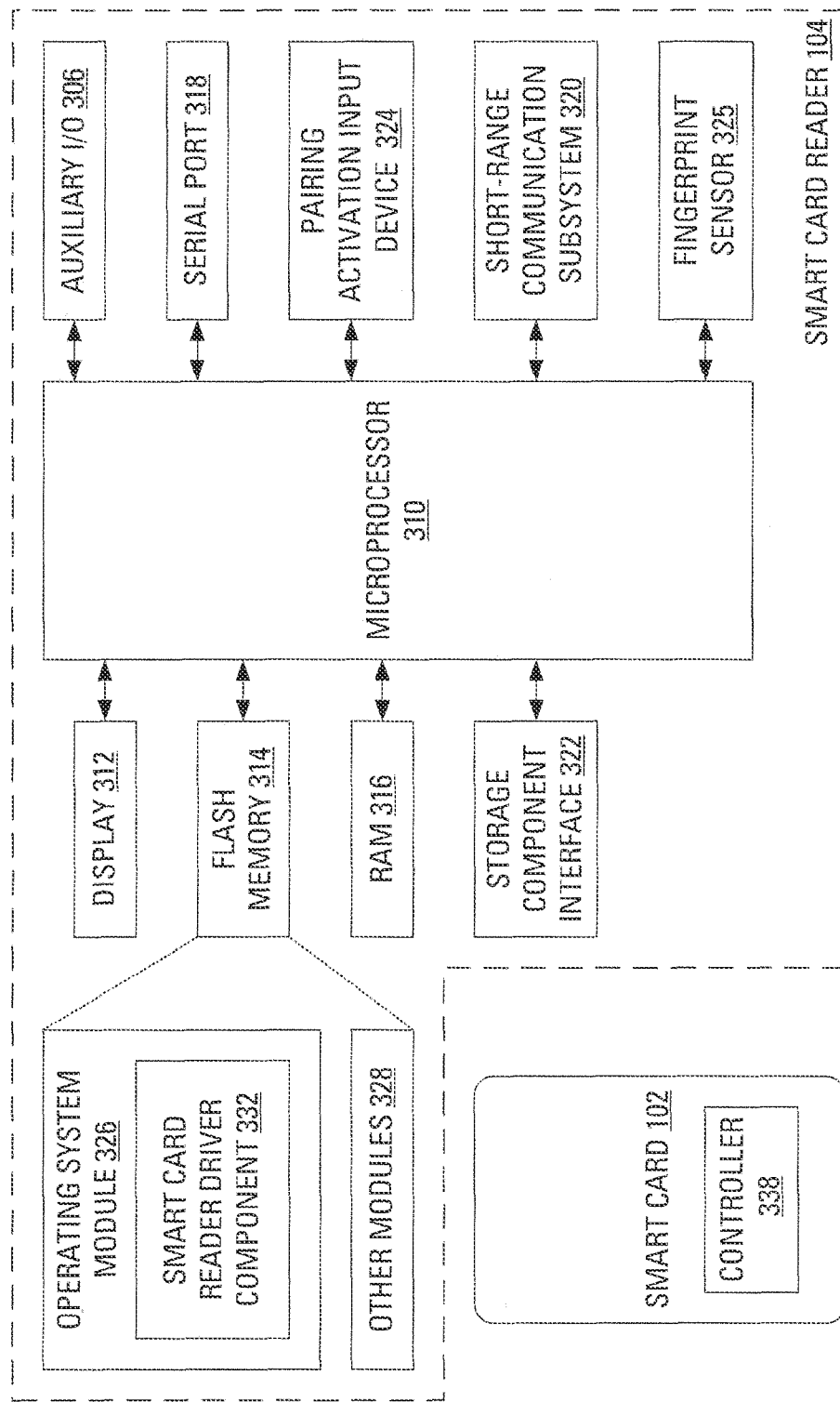
FIG. 3 schematically illustrates the smart card reader of FIG. 1.

FIG. 3 illustrates an example embodiment of the smart card reader 104. The smart card reader 104 includes a controller including at least one smart card reader microprocessor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a RAM 316, a serial port 318 (e.g., a Universal Serial Bus, or "USB", port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric information input device 325 (e.g., a fingerprint sensor). In some embodiments, the RAM 316 includes a portion allocated to a data cache.

There exist many form factors for fingerprint input devices. One example fingerprint input device has a bar shape. A silicon sensor records a plurality of images as a user swipes a finger across the bar. The silicon sensor then generates an image of the finger from the plurality of images. Another example fingerprint input device has a pad shape. A sensor generates an image as a user holds a finger on the pad, which is designed with a size to accommodate an entire fingerprint.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card driver module 230C of the mobile communication device 106. Based on results of various communications with the smart card reader 104, the smart card driver module 230C maintains a record of the state of the smart card 102. The operating system module code 326, code for specific device application modules 328, code for the smart card reader driver component 332, or code components thereof, may be temporarily loaded into a volatile storage medium such as the RAM 316. Received communication signals and other data may also be stored in the RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader microprocessor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code modules or components may then be installed by the user (or automatically) in the RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 may be installed as one of the software applications 328 so long as suitable security related precautions are taken to ensure that the smart card reader driver component 332 cannot be modified or tampered with by unauthorized users.

The serial port 318 may be a USB-type interface port for interfacing or synchronizing with another device, such as a personal computer or the mobile communication device 106. The serial port 318 is used to set preferences through an external device or software application or exchange data with a device, such as the mobile communication device 106. Such data may be stored on the smart card 120 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the mobile communication device 106 or personal computer and the smart card reader 104. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 204 (FIG. 2) of the mobile communication device 106 operates using the same protocol, thereby facilitating wireless communication between the mobile communication device 106 and the smart card reader 104. Any communications mechanism and/or protocol may be implemented for the short-range communications subsystems 204, 320, so long as the mobile communication device 106 can communicate with the smart card reader 104 when the mobile communication device 106 is no more than a predetermined distance away from the smart card reader 104.

In one embodiment, the smart card 102 may be compliant with a Federal Information Processing Standards Publication (FIPS) standard. For example, FIPS 201 is a United States federal government standard that specifies Personal Identity Verification (PIV) requirements for Federal employees and contractors. It is forecast that Personal Identity Verification (PIV) Cards will be deployed to all US government employees (in the millions) over the next few years.

PIV cards store biometric templates (e.g., fingerprint templates). Access to the biometric templates on a given PIV card (i.e., a smart card) is protected by a PIN. A PIV card PIN is typically a sequence eight characters in length, with only digits 0, 1, 2, 3, 4, 5, 6, 7, 8 and 9 being valid characters. In other embodiments, the PIN may comprise a sequence of any plural number of characters.

Often, before the smart card 102 can be used, the user of the smart card is required to be authenticated as having permission to use the smart card 102. One manner in which such permission is determined is an association of a PIN with the smart card 102. When the smart card 102 is assigned to a user, the PIN is revealed to the user. Then, before the user can use the smart card 102, the user is required to be authenticated by the smart card 102.

Typically, in the situation illustrated in FIG. 1 wherein the smart card 102 is received within the smart card reader 104 and the smart card reader 104 is in communication (wired or wireless) with the mobile communication device 106, authentication is accomplished via an application executed on the mobile communication device 106. The application controls a user interface (UI) presented to the user on the display 226 of the mobile communication device 106 and the user employs the keyboard 224 to provide a candidate PIN to the mobile communication device 106. The mobile communication device 106 communicates the candidate PIN to the smart card reader 104. The smart card reader 104 communicates the candidate PIN to the smart card 102. The smart card 102 indicates authentication success or failure to the smart card reader 104. The smart card reader 104 communicates an indication of authentication success or failure to the mobile communication device 106. The mobile communication device 106 indicates authentication success or failure to the user via the application UI.

In the scenario presented above, subsequent to a candidate PIN being entered on the mobile communication device 106, the candidate PIN is transmitted between several different software and hardware components of the mobile communication device 106. For example, the candidate PIN may be transmitted from a UI component that has received the candidate PIN to the application that caused the UI component to be presented to the user. Furthermore, the UI component may transmit the candidate PIN to a kernel and the kernel may transmit the candidate PIN to the smart card reader 104 via several more components. In some cases, the candidate PIN may be transmitted, by the mobile communication device 106, to the smart card reader 104 as clear text; in other cases, the candidate PIN may be transmitted, by the mobile communication device 106, to the smart card reader 104 in an encrypted form. An attacker, therefore, has multiple opportunities to intercept a transmission of the candidate PIN from component to component between the time at which the user enters the candidate PIN on the mobile communication device 106 and the time at which the candidate PIN is transmitted by the smart card reader 104 to the smart card 102.

In overview, by configuring the smart card reader 104 to accept entry of a candidate PIN via the fingerprint sensor 325, the number of opportunities for an attacker to intercept transmission of the candidate PIN is significantly reduced.

In connection with setting up or configuring the biometric PIN entry, the user may elect to initialize a smart card user authentication application by interacting with an operating system UI on the mobile communication device 106 to select the smart card user authentication application and causing the microprocessor 228 to execute the smart card user authentication application.

The smart card user authentication application may begin by associating (step 402, FIG. 4) each of the digits 0 through 9 with one of the ten user fingers, i.e., 0—right baby, 1—right ring, etc. The smart card user authentication application may then present the result of the association to the user. Such presentation of the association may involve, for example, the microprocessor 228 generating (step 404) an image that includes a right hand and a left hand with each finger on each hand labeled with a digit. The smart card user authentication application may then cause (step 406) the image to be displayed on the display 226 of the mobile communication device 106. Additionally, the smart card user authentication application may then cause an indication of the assignment to be transmitted to the smart card reader 104. The smart card reader 104 receives the indication of the assignment of digits to fingers and stores the indication in flash memory 314.

Figure 5:
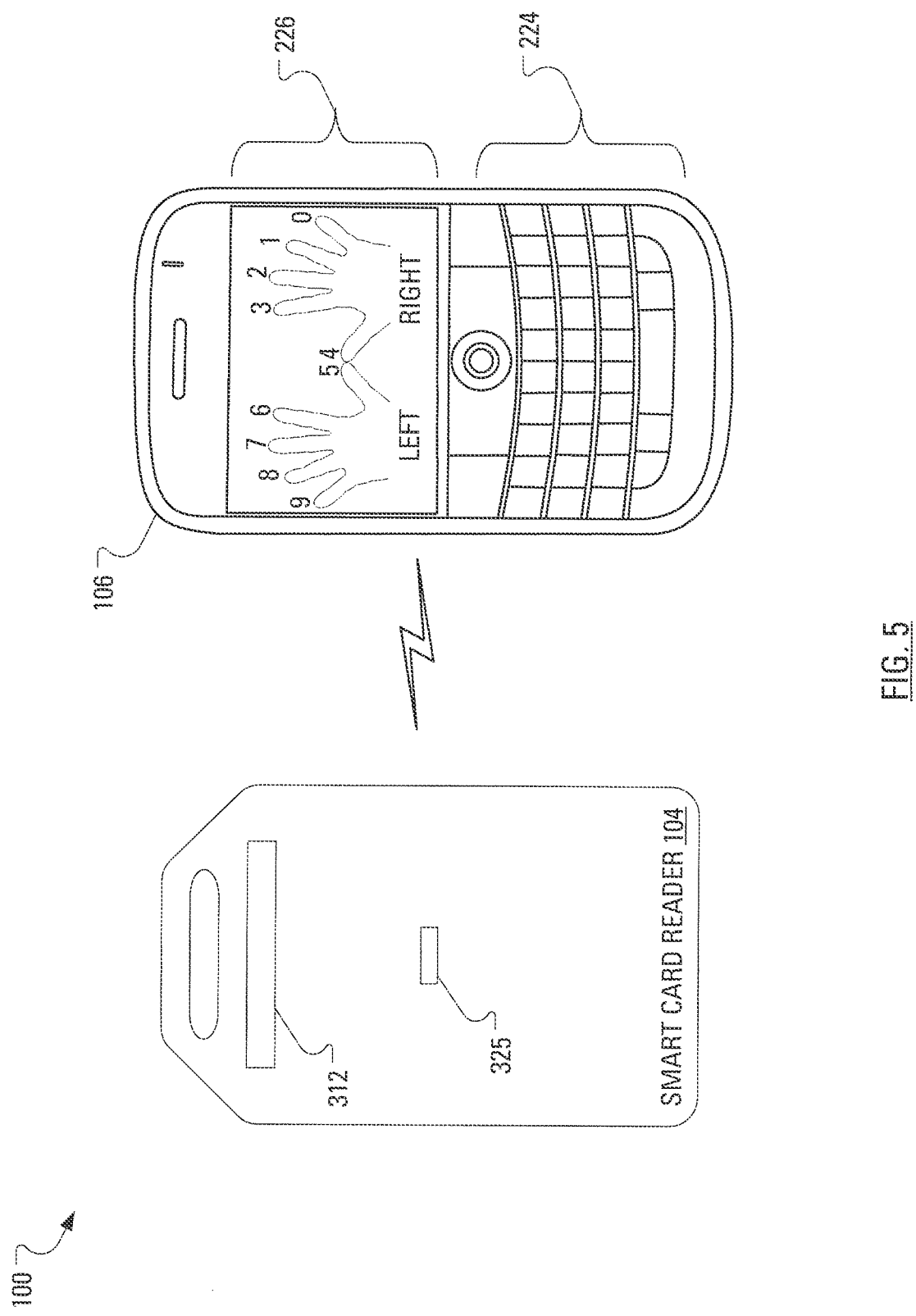
FIG. 5 illustrates the mobile communication device of FIG. 1 displaying an image of a right hand and a left hand with each finger on each hand labeled with a digit.

FIG. 5 illustrates the exemplary communication system 100 of FIG. 1 that includes the mobile communication device 106 that is enabled to communicate wirelessly with the smart card reader 104. The display 226 of the mobile communication device 106 shows, in FIG. 5, the image generated in step 404 by the microprocessor 228. The image includes a right hand and a left hand with each finger on each hand labeled with a digit.

As shown in FIG. 5, the association of characters with fingers may be orderly. For additional security, the association of characters with fingers may be random. However, the increase of security realized with random association comes at the cost of reduced convenience/user friendliness.

Figure 4:
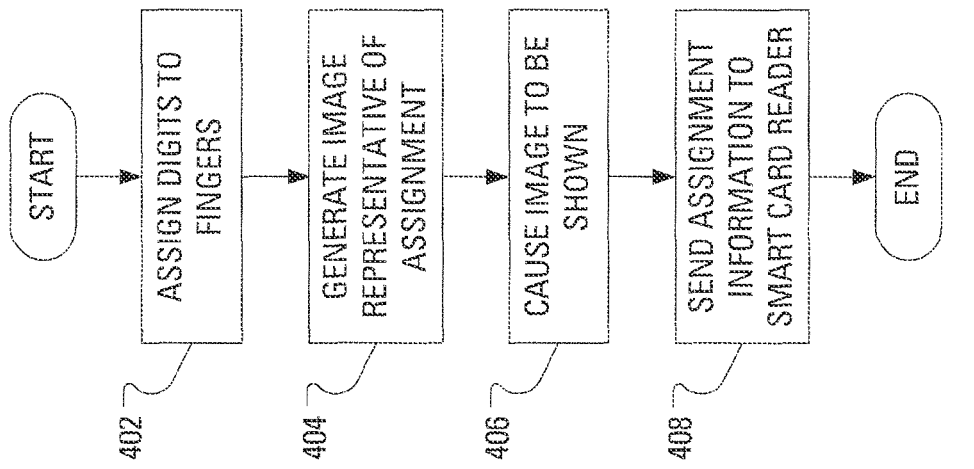
FIG. 4 illustrates example steps in a method, carried out by the mobile communication device of FIG. 1, of establishing an assignment of characters to biometric templates.

To mitigate the reduced convenience/user friendliness of random finger-to-digit assignment, and requiring the user to remember the assignment for a long duration, the steps of the method of FIG. 4 may be carried out each time it is necessary for the user to perform biometric character sequence entry.

Notably, the smart card reader 104 is oriented, in FIG. 5, such that a side of the smart card reader 104 is shown that is opposite to the side shown in FIG. 1 on which the smart card 102 is received. The orientation of the smart card reader 104 allows identification of the smart card reader display module 312 and the fingerprint sensor 325.

It is left to the user to remember the assignment of digits to fingers. More particularly, the user should, at least, remember a sequence of fingers required to be provided to the fingerprint sensor 325 to enter the required smart card PIN. For example, if the smart card PIN is eight 1's then the user need not remember the entire assignment of digits to fingers. Instead, the user need only remember to provide, for example, the right middle finger to the fingerprint sensor 325 eight times.

At some point, either before or after the assignment of digits to fingers, the smart card user authentication application may cause the presentation of a user interface to facilitate fingerprint enrollment. That is, the smart card user authentication application may prompt the user to enter particular fingers using the fingerprint sensor 325. Responsive to commands received from the mobile device 106 and input received at the fingerprint sensor 325, the smart card reader 104 may store the received input as a fingerprint template associated with the finger that the smart card user authentication application has prompted the user to enter.

Figure 6:
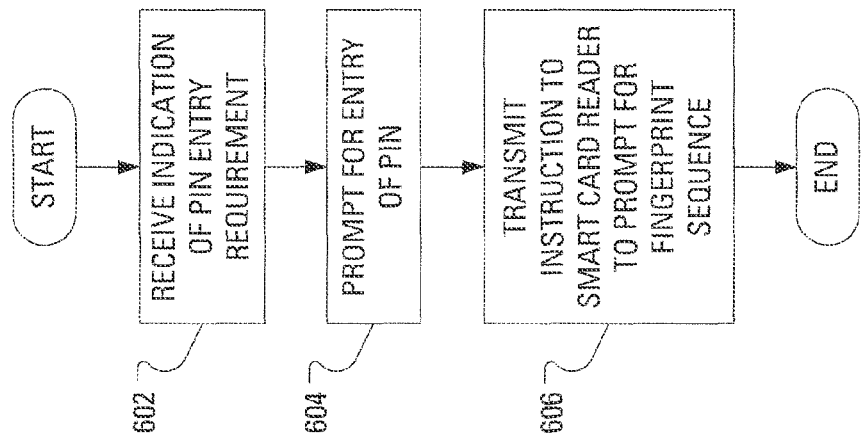
FIG. 6 illustrates example steps in a method, carried out by the mobile communication device of FIG. 1, of prompting user input.

In connection with using biometric PIN entry for authentication, the mobile device 106 determines (step 602, FIG. 6) that PIN entry is required. The requirement may arise responsive to the mobile device 106 making a request of the smart card 102 to perform an action. The action may relate, for several examples, to signing an electronic message, decrypting an electronic message or authenticating access to the mobile device 106. The determining may be based on a preconfiguration of the mobile device 106 to prompt the user for a PIN in conjunction with requesting actions by the smart card 102. Additionally, the mobile device 106 may receive an indication, from the smart card reader 104, of a requirement for PIN entry.

Responsive to receiving the indication, the microprocessor 228 of the mobile communication device 106 causes (step 604) presentation of a prompt to the user. Such a prompt may be, for example, the text "Enter PIN on reader" presented on the display 226 of the mobile communication device 106.

The microprocessor 228 may also arrange (step 606) transmission of a message to the smart card reader 104, where the message instructs the smart card reader 104 to expect input at the fingerprint sensor 325.

Responsive to receiving (step 702, FIG. 7) the message from the mobile communication device 106, the smart card reader 104 may indicate (step 704), to the user, readiness to accept biometric PIN entry. To accomplish such indicating, the smart card reader microprocessor 310 may arrange the presentation of a prompt, such as "Enter PIN:", on the display module 312 of the smart card reader 104.

Responsive to the prompt presented on one, or both, of the display 226 of the mobile communication device 106 and the display module 312 of the smart card reader 104, the user is expected to provide a fingerprint using the fingerprint sensor 325. Responsive to the fingerprint entry, the smart card reader microprocessor 310 receives (step 706) a candidate fingerprint. To allow the user to keep track of how many digits of the PIN have been entered, for each finger entered, the smart card reader microprocessor 310 may arrange the presentation of an asterisk (i.e., "*") or other character to substitute for the PIN digit on the display module 312 of the smart card reader 104.

The smart card reader microprocessor 310 then establishes (step 708), within a predetermined degree of certainty, which of the stored fingerprint templates may be considered to be a matching fingerprint template.

The progression from the receipt (step 706) of a candidate fingerprint to the establishment (step 708) of which stored fingerprint template is a match, may be dependent upon the candidate fingerprint being of acceptable quality. For example, if the candidate fingerprint is determined to not be of acceptable quality, the smart card reader microprocessor 310 may arrange presentation of an indication that the most recent fingerprint entry is unacceptable. The presentation may appear on one, or both, of the display 226 of the mobile communication device 106 and the display module 312 of the smart card reader 104. Additionally or alternatively, the smart card reader microprocessor 310 may arrange the presentation of a character other than an asterisk (i.e., "*") on the display module 312 of the smart card reader 104, such that the user can recognize that the provided fingerprint is not of acceptable quality.

Once the smart card reader microprocessor 310 has determined the matching fingerprint template, the smart card reader microprocessor 310 determines (step 710) the digit that corresponds to the matching fingerprint template. The smart card reader microprocessor 310 then appends (step 712) the digit to a character sequence (i.e., a temporary PIN) and determines (step 714) whether further input is expected.

Determining that further input is expected may rely on comparing to a predetermined PIN size stored on the smart card reader 104. Alternatively, a biometric gesture may signify that no further input should be expected. For example, the digit 0 and the corresponding fingerprint template may act as an "end-of-PIN" indication. In an alternative example, the user may signify that no further input should be expected by tapping one or more times on the fingerprint sensor 325.

If the smart card reader microprocessor 310 determines (step 714) that further input is expected, the smart card reader 104 may indicate (step 704), to the user, readiness to accept further biometric PIN entry. Subsequently, the smart card reader microprocessor 310 receives a candidate fingerprint (step 706), determines a matching fingerprint template (step 708), determines a digit corresponding to the matching fingerprint template (step 710) and appends the digit to the temporary PIN (step 712). Again, the smart card reader microprocessor 310 determines (step 714) whether further input is expected.

If the smart card reader microprocessor 310 determines (step 714) that no further input is expected, the smart card reader microprocessor 310 may arrange transmission (step 716) of the temporary PIN to the smart card as a candidate PIN. Responsive to receiving the candidate PIN, the smart card 102 performs a comparison of the candidate PIN to the locally stored smart card PIN and returns a result of the comparison, i.e., a verification indication, to the smart card reader 104. Responsive to receiving (step 718) the verification indication, the smart card reader microprocessor 310 may arrange transmission (step 720) of the verification indication to the mobile communication device 106.

Other variations are possible to handle a scenario wherein the smart card reader 104 does not have drivers appropriate to communicating directly to the smart card 102. In a first variation, the smart card reader 104 notifies the mobile device 106 that a complete PIN has been obtained, stores the PIN and transmits an indication of the number of characters in the PIN to the mobile device 106. The mobile device 106 may then prepare and transmit to the smart card reader 104 a command to unlock the smart card 102 using the PIN. The smart card reader 104, upon receiving the command, may inject the stored PIN into the command. Advantageously, the PIN is not communicated to the mobile device 106.

In a second variation, the smart card reader 104 transmits the completed PIN to the mobile device 106. The mobile device 106 then creates a command that includes the PIN and transmits the command to the smart card reader 104. The smart card reader 104 then transmits the command to the smart card 102.

Where the verification indication is negative, that is, where the candidate PIN does not match the smart card PIN, the smart card reader microprocessor 310 may arrange presentation of a "Please re-enter PIN" prompt on the display module 312 of the smart card reader 104. A limit on the number of re-entry attempts may be provided.

Figure 7:
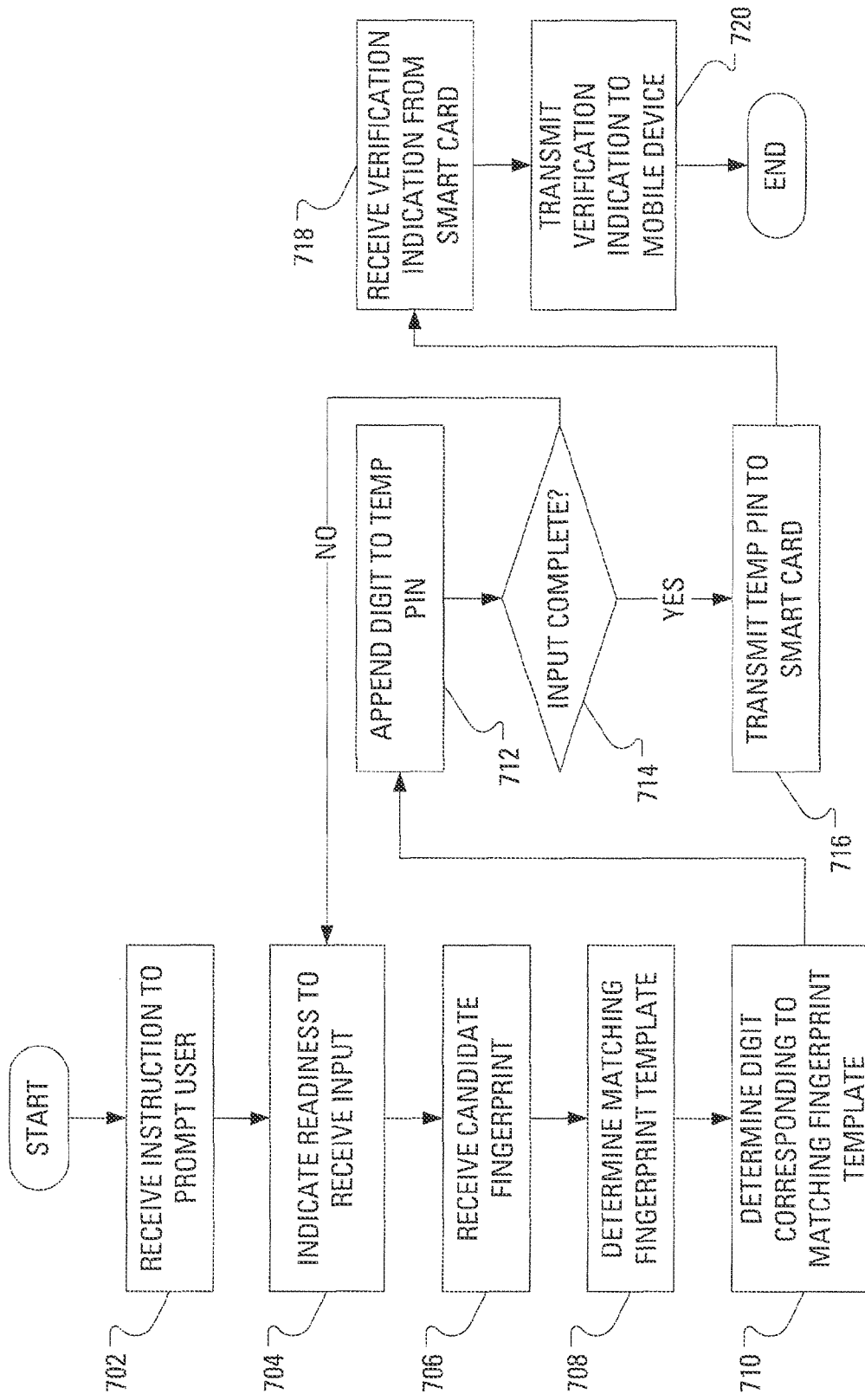
FIG. 7 illustrates example steps in a method, carried out by the smart card reader of FIG. 1, of receiving user input and transmitting a character sequence, determined from the user input, to the smart card of FIG. 1.

As an alternative to the arrangement of steps in the method presented in FIG. 7, an arrangement of steps is presented in a method presented in FIG. 8.

In the method presented in FIG. 7, the matching (step 708) of a candidate fingerprint to a fingerprint template is accomplished one fingerprint at a time. In contrast, in the method presented in FIG. 8, an entire sequence of candidate fingerprints is received and, subsequently, each candidate fingerprint is matched to a fingerprint template.

In the method of FIG. 8, responsive to receiving (step 802) the message from the mobile communication device 106, the smart card reader 104 may indicate (step 804), to the user, readiness to accept biometric PIN entry. To accomplish such indicating, the smart card reader microprocessor 310 may arrange the presentation of a prompt, such as "Enter PIN:", on the display module 312 of the smart card reader 104.

Responsive to the prompt presented on one, or both, of the display 226 of the mobile communication device 106 and the display module 312 of the smart card reader 104, the user is expected to provide a fingerprint using the fingerprint sensor 325. Responsive to the fingerprint entry, the smart card reader microprocessor 310 receives (step 806) a candidate fingerprint. To allow the user to keep track of how many digits of the PIN have been entered, for each finger entered, the smart card reader microprocessor 310 may arrange the presentation of an asterisk (i.e., "*") or other character to substitute for the PIN digit on the display module 312 of the smart card reader 104.

The smart card reader microprocessor 310 then stores (step 808) the candidate fingerprint as part of a candidate sequence of biometric candidates and determines (step 810) whether further input is expected.

If the smart card reader microprocessor 310 determines (step 810) that further input is expected, the smart card reader 104 may indicate (step 804), to the user, readiness to accept further biometric PIN entry. Subsequently, the smart card reader microprocessor 310 receives a further candidate fingerprint (step 806) and stores (step 808) the further candidate fingerprint as part of the candidate sequence before determining (step 810) whether further input is expected.

If the smart card reader microprocessor 310 determines (step 810) that no further input is expected, the smart card reader microprocessor 310 may select (step 812), for processing, a candidate fingerprint from the stored candidate sequence. The processing involves determining (step 814), within a predetermined degree of certainty, which of the stored fingerprint templates may be considered to be a match for the selected fingerprint candidate.

Once the smart card reader microprocessor 310 has determined (step 814) the matching fingerprint template, the smart card reader microprocessor 310 determines (step 816) the digit that corresponds to the matching fingerprint template. The smart card reader microprocessor 310 then appends (step 818) the digit to a character sequence (i.e., a temporary PIN) and determines (step 820) whether all candidate fingerprints in the candidate sequence have been considered.

If the smart card reader microprocessor 310 determines (step 820) that not all candidate fingerprints in the candidate sequence have been considered, the smart card reader microprocessor 310 may return to select (step 812), for processing, another candidate fingerprint from the stored candidate sequence. The smart card reader microprocessor 310 may process the selected candidate fingerprint by determining (step 814) a matching fingerprint template for the selected fingerprint candidate, determining (step 816) the digit that corresponds to the matching fingerprint template and appending (step 818) the digit to the character sequence (i.e., a temporary PIN). The smart card reader microprocessor 310 again determines (step 820) whether all candidate fingerprints in the candidate sequence have been considered.

If the smart card reader microprocessor 310 determines (step 820) that all candidate fingerprints in the candidate sequence have been considered, the smart card reader microprocessor 310 may arrange transmission (step 822) of the temporary PIN to the smart card as a candidate PIN. Responsive to receiving the candidate PIN, the smart card 102 performs a comparison of the candidate PIN to the locally stored smart card PIN and returns a result of the comparison, i.e., a verification indication, to the smart card reader 104. Responsive to receiving (step 824) the verification indication, the smart card reader microprocessor 310 may arrange transmission (step 826) of the verification indication to the mobile communication device 106.

As will be appreciated by a person of ordinary skill in the art, the presentation, to the user, of the result of the associating of digits to fingerprint templates need not involve presentation of an image on the mobile communication device 106. It may be considered more secure to arrange the presentation of the result of the associating of digits to fingerprint templates on the smart card reader 104.

In one advantage of certain embodiments of the PIN entry scheme presented herein, a potential attacker is unable to determine a given smart card PIN by observing the user swiping fingers, since mapping of fingers to digits is random. In contrast, where a user is entering digits on the keyboard 224 of the mobile communication device 106, an attacker might observe the entry of digits and learn the smart card PIN.

An Information Technology (IT) policy may be supplied to the mobile communication device 106 from a central control center. The IT policy may be used by the microprocessor 228 of the mobile communication device 106 to establish whether the user of the mobile communication device 106 should perform PIN entry on the keyboard 224 of the mobile communication device 106 or perform PIN entry using the scheme presented herein.

In a further embodiment, the smart card PIN is not strictly numeric (made up only of digits in the 0-9 range). Instead, the smart card PIN may be alpha-numeric and the character set may extend well beyond the English alphabet. In the alpha-numeric PIN case, the user may provide the smart card user authentication application with the smart card PIN. The smart card user authentication application may then randomly assign (step 402) the alphanumeric characters in the smart card PIN to the user's fingers. The smart card user authentication application may then generate (step 404) an image that includes a right hand and a left hand with each finger on each hand labeled with an alpha-numeric character. The smart card user authentication application may then cause (step 406) the image to be displayed on the display 226 of the mobile communication device 106. Additionally, the smart card user authentication application may cause an indication of the assignment to be transmitted to the smart card reader 104.

In accordance with various embodiments, the storage of assignment of digits to fingers at the smart card reader 104 and the storage of the fingerprint templates during fingerprint enrollment may be accomplished in a secure manner. Exposure of these values would assist an attacker in determining the smart card PIN when knowledge of these values is combined with watching the user employ the simplified biometric PIN entry scheme described herein.

During the simplified biometric PIN entry scheme described herein, there is no requirement for the temporary PIN to be transmitted between the mobile communication device 106 and the smart card reader 104. This is ideal since it is easier to provide a higher level of physical security around the smart card reader 104 than it is to provide a higher level of physical security around the mobile communication device 106.

Configuration of the simplified biometric PIN entry scheme may allow a user to accommodate loss of one or more fingers. Furthermore, configuration options may also allow a user to disable the simplified biometric PIN entry scheme.

While a fingerprint has been used as an example element of biometric data, other elements of biometric data may equally be used. Biometric information may include, for example, fingerprints, retinal scans, face geometry scans, hand geometry scans, voice or speech prints, etc.

Indeed, dependent upon the type of fingerprint sensor 325 used, more than one character can be associated with each finger. If a bar-type sensor is used, the direction in which the fingerprint is swiped (top-to-bottom, bottom-to-top, left-to-right, etc.) can be used as an extra variable when associating fingerprints to characters. For example, a top-to-bottom swipe of the right index finger may be associated with "1" while a bottom-to-top swipe of the right index finger may be associated with "B". If a pad-type sensor is used, various different types of inputs or gestures may be mapped to various characters. For example, a single tap of the right index finger may be associated with an "A" while a double tap of the right index finger may be associated with a "B." Moreover, a swipe of the right index finger from left-to-right may be associated with a "C" while a swipe of the right index finger from right-to-left may be associated with a "D," etc.

Furthermore, it will be appreciated that, although for the foregoing description, it has been assumed that the character sequence may be used as a candidate PIN to unlock a smart card received by a smart card reader, it may be that the character sequence formed may not be related to smart card access. Indeed, biometric character sequence entry may be used in myriad applications wherein there is a necessity for entry of a character sequence and a biometric input device is available.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of handling receipt of a character sequence, said method comprising:
   generating an image that illustrates a random association between a plurality of fingers and a plurality of characters;
   receiving, via a biometric input device, a candidate sequence of a plurality of biometric candidates;
   forming a character sequence from said candidate sequence by, for each biometric candidate in said candidate sequence:
      determining that said each biometric candidate matches a stored biometric template;
      determining, according to the association, that said stored biometric template is associated with a character from among the plurality of characters; and
   transmitting said character sequence to an identity verification element.

2. The method of claim 1 wherein said each biometric candidate comprises a candidate fingerprint, and wherein said stored biometric template comprises a stored fingerprint template.

3. The method of claim 1 wherein said character comprises a numeric character.

4. The method of claim 1 further comprising prompting for entry of said candidate sequence.

5. The method of claim 4 further comprising initiating said prompting responsive to receiving a message from an associated communication device, said message including an instruction to prompt for entry of said candidate sequence.

6. The method of claim 4 further comprising:
   repeating said prompting for entry ahead of receiving said each biometric candidate;

determining that a most recently received biometric candidate is a final biometric candidate in said candidate sequence.

7. The method of claim 1 further comprising receiving, from said identity verification element, a verification indication.

8. The method of claim 7 further comprising transmitting said verification indication to an associated communication device.

9. An apparatus comprising:
a memory storing a plurality of biometric templates;
a biometric input device;
a storage component interface for receiving an identity verification element for communication therewith;
a processor adapted to:
generate an image that illustrates a random association between a plurality of fingers and a plurality of characters;
receive, from said biometric input device, a candidate sequence of a plurality of biometric candidates; and
form a character sequence from said candidate sequence by, for each biometric candidate in said candidate sequence:
determining that said each biometric candidate matches a biometric template among said plurality of biometric templates;
determining, according to the association, that said biometric template is associated with a character from among the plurality of characters; and
transmit said character sequence to an identity verification element.

10. The apparatus of claim 9 wherein said each biometric candidate comprises a candidate fingerprint, and wherein said biometric template comprises a fingerprint template.

11. The apparatus of claim 9 wherein said character comprises a numeric character.

12. The apparatus of claim 9 wherein said processor is further adapted to receive, from said identity verification element, a verification indication.

13. The apparatus of claim 12 wherein said processor is further adapted to transmit said verification indication to an associated communication device.

14. The apparatus of claim 9 wherein said identity verification element comprises a smart card.

15. A non-transitory computer readable medium containing computer-executable instructions that, when performed by a processor, cause said processor to:
generate an image that illustrates a random association between a plurality of fingers and a plurality of characters;
receive a candidate sequence of a plurality of biometric candidates; and
form a character sequence from said candidate sequence by, for each biometric candidate in said candidate sequence:
determining that said each biometric candidate matches a stored biometric template; and
determining, according to the association, that said stored biometric template is associated with a character from among the plurality of characters; and
transmit said character sequence to an identity verification element.

16. The non-transitory computer readable medium of claim 15 wherein said each biometric candidate comprises a candidate fingerprint, and wherein said stored biometric template comprises a stored fingerprint template.

17. The non-transitory computer readable medium of claim 15 wherein said character comprises a numeric character.

18. The non-transitory computer readable medium of claim 5 wherein said instructions further cause said processor to receive, from said identity verification element, a verification indication.

19. The non-transitory computer readable medium of claim 18 wherein said instructions further cause said processor to transmit said verification indication to an associated communication device.

20. The non-transitory computer readable medium of claim 15 wherein said identity verification element comprises a smart card.

21. The method of claim 1 wherein receiving of the candidate sequence occurs responsive to an action.

22. The method of claim 2 wherein a candidate fingerprint is matched to a fingerprint template one fingerprint at a time or an entire sequence at a time.

23. The method of claim 1 wherein said identity verification element is a smart card.

24. The method of claim 2 further comprising determining the candidate fingerprint is of unacceptable quality and responsive to the determining, providing an indication.

25. The method of claim 24 wherein the indication is providing on at least one of a display of the device and a display on an identity verification element reader.

26. The method of claim 2 wherein the mapping of a fingerprint to a character sequence is determined by a gesture input.

27. The method of claim 26 wherein the gesture input comprises one of a single tap, double tap, and swipe.

* * * * *